United States Patent
Mann et al.

(10) Patent No.: US 7,628,099 B2
(45) Date of Patent: Dec. 8, 2009

(54) MACHINING METHOD TO CONTROLLABLY PRODUCE CHIPS WITH DETERMINABLE SHAPES AND SIZES

(75) Inventors: James B. Mann, West Lafayette, IN (US); M. Ravi Shankar, West Lafayette, IN (US); Srinivasan Chandrasekar, West Lafayette, IN (US); W. Dale Compton, West Lafayette, IN (US); Wilfredo Moscoso, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 217 days.

(21) Appl. No.: 11/381,392

(22) Filed: May 3, 2006

(65) Prior Publication Data

US 2006/0243107 A1 Nov. 2, 2006

Related U.S. Application Data

(62) Division of application No. 10/051,626, filed on Oct. 27, 2001, now Pat. No. 6,706,324.

(60) Provisional application No. 60/677,248, filed on May 3, 2005, provisional application No. 60/244,087, filed on Oct. 28, 2000.

(51) Int. Cl.
*C21D 7/04* (2006.01)

(52) U.S. Cl. .............................. 82/1.11; 82/904; 408/17; 148/308

(58) Field of Classification Search ................. 82/1.11, 82/118, 123, 133, 134, 904; 148/400, 308; 408/17

See application file for complete search history.

(56) References Cited

U.S. PATENT DOCUMENTS

| | | | | | |
|---|---|---|---|---|---|
| 655,868 | A | * | 8/1900 | Holtgen | 29/4.53 |
| 2,452,211 | A | * | 10/1948 | Rosenthal | 451/37 |
| 2,453,136 | A | * | 11/1948 | Karweit | 408/17 |
| 2,514,759 | A | * | 7/1950 | Hallden | 74/22 R |
| 2,521,900 | A | * | 9/1950 | Clark | 74/22 R |
| 3,003,372 | A | * | 10/1961 | Findley | 408/17 |
| 3,015,914 | A | * | 1/1962 | Roney | 451/160 |
| 3,028,771 | A | * | 4/1962 | Bunnell | 173/199 |
| 3,105,482 | A | * | 10/1963 | Mieville | 125/30.01 |
| 3,174,404 | A | | 3/1965 | Findley | |

(Continued)

FOREIGN PATENT DOCUMENTS

DE 9212079 12/1992
JP 56045336 A * 4/1981

*Primary Examiner*—Boyer D Ashley
*Assistant Examiner*—Sara Addisu
(74) *Attorney, Agent, or Firm*—Hartman & Hartman, P.C.; Gary M. Hartman; Domenica N.S. Hartman

(57) ABSTRACT

A method of controllably producing chips with a desired shape and size. The method generally entails machining a body with a cutting tool while superimposing modulation on the cutting tool so as to move the cutting tool relative to the body being machined and cause instantaneous and periodic separation between the cutting tool and the body at a point of contact between the cutting tool and the body, wherein each separation between the cutting tool and the body yields a chip. In this manner, the shapes and sizes of the chips are determined at least in part by the modulation cycle, and particularly the length of time the cutting tool is engaged with the body being machined.

24 Claims, 3 Drawing Sheets

U.S. PATENT DOCUMENTS

| | | | |
|---|---|---|---|
| 3,303,522 A * | 2/1967 | Kumabe et al. | 408/17 |
| 3,471,724 A * | 10/1969 | Balamuth | 310/26 |
| 3,504,516 A * | 4/1970 | Sundberg | 72/203 |
| 3,619,671 A * | 11/1971 | Shoh | 310/325 |
| 3,837,121 A * | 9/1974 | Schirmer | 451/160 |
| 4,052,132 A * | 10/1977 | Oates | 408/1 R |
| 4,104,900 A * | 8/1978 | Nels | 29/4.53 |
| 4,261,675 A * | 4/1981 | Zankl | 409/196 |
| 4,640,156 A | 2/1987 | Nakagawa et al. | |
| 4,646,595 A * | 3/1987 | Slee | 82/118 |
| 4,667,546 A | 5/1987 | Dombrowski et al. | |
| 4,911,044 A | 3/1990 | Mishiro et al. | |
| 5,113,728 A * | 5/1992 | Medeksza | 82/1.11 |
| 5,291,812 A * | 3/1994 | Yen et al. | 82/134 |
| 5,331,870 A * | 7/1994 | Chin-Long | 82/1.11 |
| 5,342,152 A | 8/1994 | Medeksza | |
| 5,778,745 A * | 7/1998 | Furusawa et al. | 82/1.11 |
| 5,857,814 A * | 1/1999 | Jang | 408/6 |
| 5,911,802 A * | 6/1999 | Kimura et al. | 82/1.11 |
| 5,939,146 A * | 8/1999 | Lavernia | 427/446 |
| 6,202,521 B1 | 3/2001 | Rossetti et al. | |
| 6,925,915 B1 * | 8/2005 | Claesson et al. | 82/133 |
| 7,131,797 B2 | 11/2006 | Kai et al. | |
| 7,216,571 B2 * | 5/2007 | Schreiber et al. | 82/1.11 |
| 2002/0150496 A1 * | 10/2002 | Chandrasekar et al. | 419/33 |
| 2005/0167008 A1 * | 8/2005 | Chandrasekar et al. | 148/400 |
| 2006/0248980 A1 * | 11/2006 | Mann et al. | 75/246 |
| 2006/0251480 A1 * | 11/2006 | Mann et al. | 408/1 R |

* cited by examiner

α – Rake angle
Ø – Shear plane angle
γ – Clearance angle
$t_o$ – Undeformed chip thickness
$t_c$ – Deformed chip thickness
$V_c$ – Cutting velocity

MACHINING METHOD TO CONTROLLABLY PRODUCE CHIPS WITH DETERMINABLE SHAPES AND SIZES

CROSS REFERENCE TO RELATED APPLICATIONS

This patent application claims the benefit of U.S. Provisional Application No. 60/677,248, filed May 3, 2005, and is related to U.S. Pat. No. 7,294,165, which is a division application Ser. No. 10/051,626 filed on Oct. 27, 2001, now of U.S. Pat. No. 6,706,324, which claimed the benefit of U.S. Provisional Application No. 60/244,087, filed Oct. 28, 2000. The contents of these prior applications and patents are incorporated herein by reference.

BACKGROUND OF THE INVENTION

The present invention generally relates to methods of machining a body to produce chips, and more particularly to a machining method in which a superimposed modulation is imposed on a cutting tool to produce chips by causing instantaneous and periodic separation between the cutting tool and the body.

Significant benefits can be gained by deforming metal alloys through the application of very large plastic strains. Principal among these are microstructure refinement and enhanced mechanical and physical properties. Of particular current interest is the use of "severe" plastic deformation (SPD) to produce bulk solids with ultra-fine grained microstructures (UFG's), especially nanocrystalline structures (NS) characterized by their atoms arranged in crystals with a nominal dimension of less than one micrometer. Nanocrystalline solids have become of interest because they appear to have significant ductility, formability and resistance to crack propagation, and possess interesting chemical, optical, magnetic and electrical properties. Nanocrystalline solids also appear to respond to radiation and mechanical stress quite differently than microcrystalline materials (crystals with a nominal dimension of one micrometer to less than one millimeter), and their response can be varied by changing the crystal size. Materials made by consolidating nanocrystalline powders have also been shown to have enhanced attributes not typically found in conventional materials. As a result, nanocrystalline materials are believed to have significant potential for use in industrial applications, provided they can be manufactured in a cost-effective manner.

Multi-stage deformation processing is one of the most widely used experimental approaches to studying microstructural changes produced by very large strain deformation. Notable examples include such techniques as rolling, drawing and equal channel angular extrusion (ECAE). In this approach, very large plastic strains (true plastic strains of four or more) are imposed in a specimen by the cumulative application of deformation in multiple stages, the effective strain in each stage of deformation being on the order of one. The formation of micro- and nanocrystalline structures has been demonstrated in a variety of ductile metals and alloys using multi-stage deformation processing. However, there are significant limitations and disadvantages with this processing technique. A significant limitation is the inability to induce large strains in very strong materials, such as tool steels. Other limitations include the inability to impose a strain of much greater than one in a single stage of deformation, the considerable uncertainty of the deformation field, and the minimal control over the important variables of the deformation field—such as strain, temperature, strain rate and phase transformations—that are expected to have a major influence on the evolution of microstructure and material properties.

The most widely used technique for synthesizing nanocrystalline metals has been by condensation of metal atoms from the vapor phase. In this technique, the metal is evaporated by heating and the evaporated atoms then cooled by exposure to an inert gas such as helium or argon to prevent chemical reactions, thereby enabling the purity of the metal to be maintained. The cooled atoms condense into single-crystal clusters with sizes typically in the range of 1 to 200 nm. The production of ceramic nanocrystals is similar, except that evaporated metal atoms are made to react with an appropriate gas, e.g., oxygen in the case of oxide ceramics, before they are allowed to condense. The resulting crystals may be compacted and sintered to form an article, often at a sintering temperature lower than that required for a microcrystalline powder of the same material. While suitable for making powders and small compacted samples with excellent control over particle size, the condensation method is at present not practical for most applications other than experimental. A particularly limiting aspect of the condensation method is the inability to form nanocrystalline materials of alloys because of the difficulty of controlling the composition of the material from the vapor phase. Another limiting aspect of the condensation method is that high green densities are much harder to achieve as a result of the nano-size particles produced. Other methods that have been explored to synthesize nanocrystals include aerosol, sol-gel, high-energy ball-milling, and hydrothermal processes. However, these techniques cannot produce nanocrystalline materials at a cost acceptable for practical applications.

From the above, it can be seen that it would be desirable if a more controllable and preferably low-cost approach were available for synthesizing nanocrystalline solids for use in the manufacture of products. It would be desirable if such an approach were capable of producing nanocrystalline solids of a wide variety of materials, including very hard materials and alloys that are difficult or impossible to process using prior art techniques.

BRIEF SUMMARY OF THE INVENTION

The present invention provides a method for machining a body to produce chips, and particularly to a method of controllably producing chips with a desired shape and size.

The method generally entails machining a body in a manner that produces chips that, in one embodiment, may consist essentially of nano-crystals as a result of the machining operation being performed in a manner that imposes a sufficiently large strain deformation. The body can be formed of a variety of materials, including metals, metal alloys, intermetallics, and ceramic materials. Furthermore, the body may have a microstructure that is essentially free of nano-crystals, and may even have a single-crystal microstructure. The chips produced by the machining operation may be in the form of particulates, ribbons, wires, filaments, needles, fibers, and/or platelets.

The method further entails imposing a superimposed modulation on the cutting tool so as to move the cutting tool relative to the body being machined and cause instantaneous and periodic separation between the cutting tool and the body at a point of contact between the cutting tool and the body, wherein each separation between the cutting tool and the body yields a chip. In this manner, the shapes and sizes of the chips are determined at least in part by the modulation cycle, and particularly the length of time the cutting tool is engaged with the body being machined.

The chips produced in the above manner may be consolidated (with or without comminution) to form a product, such that the product is essentially a nanocrystalline monolithic material consisting essentially or entirely of nano-crystals, or of grains grown from nano-crystals. Alternatively, the chips may be dispersed in a matrix material, such that the product is a composite material in which the chips are dispersed as a reinforcement material. Yet another alternative is to form a monolithic article entirely from a single chip by deforming the chip and/or removing material from the chip.

The above aspects of the invention are based on the determination that nanocrystalline structures can be formed in materials by machining under appropriate conditions to produce very large strain deformation, including high strain rates, such as a plastic strain of about 0.5 to about 10 and a strain rate of up to $10^6$ per second. Machining processes believed to be capable of producing suitable nanocrystalline structures include cutting and abrasion techniques. Cutting speed does not appear to be determinative, such that essentially any cutting speed can be used if a cutting tool is used to perform the machining operation. Because the production method for the chips is a machining operation whose parameters can be precisely controlled, the desired nanocrystalline microstructure for the chips can be accurately and repeatably obtained for a given body material. Furthermore, the modulation-assisted machining step of this invention enables the controlled production of chips of various grain sizes and macroscopic shapes for use in a variety of application. The production of nanocrystalline chips can be achieved with this invention with minimal impact on the article being machined, such that nanocrystalline chips can be produced as a useful byproduct of an existing manufacturing operation.

In view of the above, the present invention provides a controllable and low-cost method for synthesizing nanocrystalline solids that can be used to produce monolithic and composite products. The method of this invention also makes possible the capability of producing nanocrystalline solids from materials that have been difficult or impossible to process using prior art techniques, such as very hard materials that cannot be processed by multistage deformation processes, and alloys that cannot be processed by the condensation method.

Other objects and advantages of this invention will be better appreciated from the following detailed description.

DETAILED DESCRIPTION OF THE INVENTION

The invention provides a method for the direct production of chips by modulated machining. Chips are directly manufactured from bulk materials, including metals, metal alloys, intermetallics, and ceramics. Furthermore, machining conditions can be chosen to induce severe plastic deformation that results the creation of chips with nanocrystalline microstructures from bulk materials that may have microstructures that are essentially free of nanocrystals. Modulation conditions are superimposed on the machining operation to control the size and shape of the chips, providing the capability of chips ranging from a few nanometers to several millimeters in length. Because chips of controllable morphology, size, and shape can be produced directly by the modulated machining process of this invention, the need for additional secondary comminution steps is eliminated. With controlled modulation, it is possible to produce chips with sizes and shape that include equiaxed particulates, ribbons, wires, filaments, needles, fibers, and platelets. Consequently, the term "chip" is used herein to encompass essentially any form that can be produced by a machining operation.

Commonly-assigned U.S. Pat. No. 6,706,324 discloses machining techniques for the large scale production of nanocrystalline materials based on the determination that high strain deformation during chip formation in machining leads to significant grain refinement and development of nanocrystalline microstructure in metals and alloys. The deformation that occurs in the shear plane of a chip can be seen in reference to FIG. 1, which represents the machining of a workpiece surface with a wedge-shaped indenter (tool). The material being removed by large strain deformation, namely, the chip, slides over the surface of the tool known as the rake face. The angle between the rake face of the tool and the normal to the work surface is known as the rake angle ($\alpha$). The edge of the wedge penetrating the workpiece is the cutting edge. The amount of interference between the tool and the workpiece is the undeformed chip thickness depth of cut ($t_o$) and the relative velocity between the tool and the workpiece is the cutting velocity ($V_c$). When the tool cutting edge is perpendicular to the cutting velocity and the width of cut is small compared to the cutting edge length and $t_o$, a state of plane strain deformation prevails, which is believed to be a preferred configuration for experimental and theoretical investigations of machining.

Figure 1:
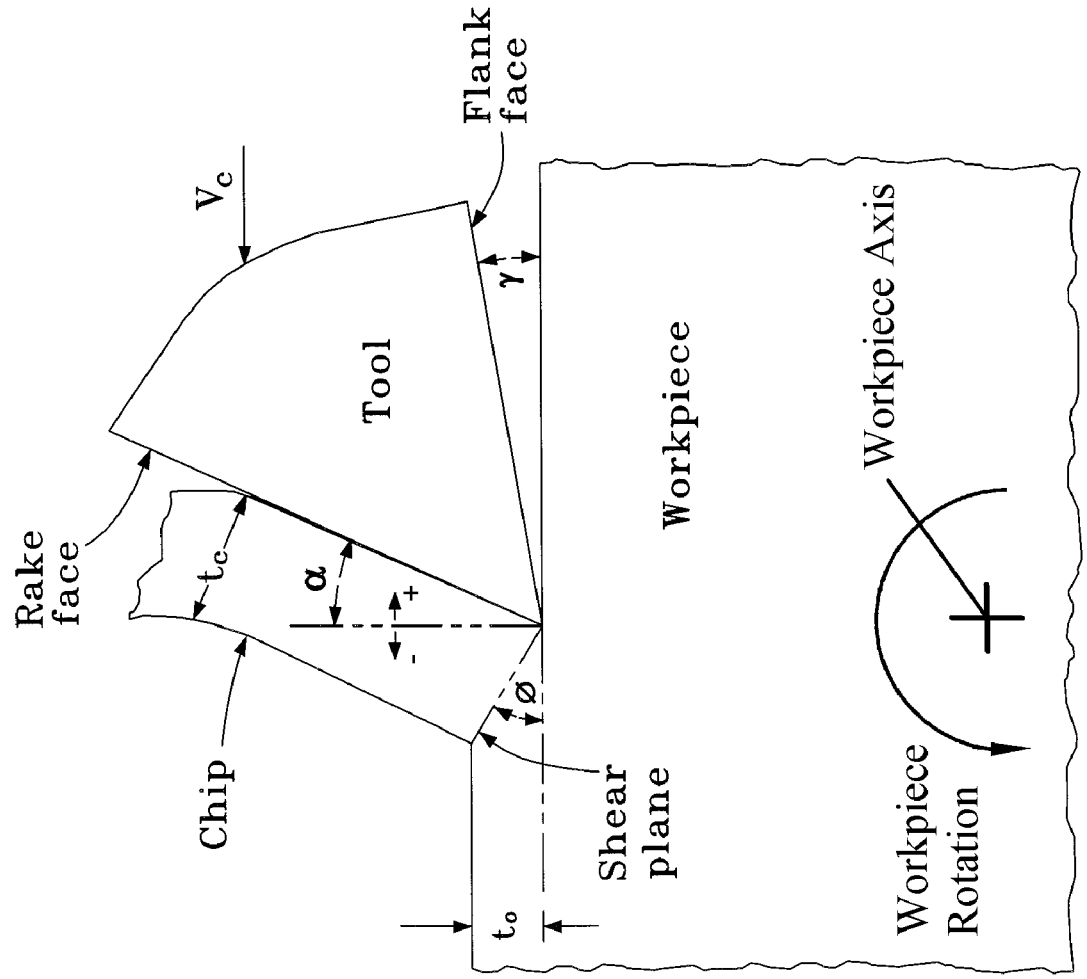
FIG. 1 schematically represents the process of machining a body with a cutting tool to produce nanocrystalline chips in accordance with an embodiment of this invention.

The chip formation in FIG. 1 is seen to occur by concentrated shear along a plane called the shear plane, where a shear strain ($\gamma$) is imposed during chip formation. The shear strain can be estimated by Equation (1) below:

$$\gamma = \cos \alpha / \sin \phi \cos(\phi - \alpha) \tag{Eq. 1}$$

where the shear plane angle ($\phi$) is a known function of $t_o$ and $t_c$. The effective Von Mises strain ($\epsilon$) can be predicted using $$\epsilon = \gamma/(3)^{1/2} \tag{Eq. 2}$$

Equation (1) shows that the shear strain ($\gamma$) can be varied over a wide range by varying the rake angle ($\alpha$) from large positive to large negative values (see FIG. 1). Additionally, the friction at the tool-chip interface also affects shear strain ($\gamma$) via its effect on the shear plane angle $\phi$.

In view of the above, and as reported in the literature, effective plastic strains in the range about 0.5 to about 10 and strain rates of up to $10^6$ per second can be generated with appropriate machining conditions, as can a wide range of shear plane temperatures. These ranges of values are substantially greater than can be realized in typical severe plastic deformation processes. Geometric parameters of machining like depth of cut ($t_o$) rake angle ($\alpha$) and cutting velocity ($V_c$) affect the shear deformation in a manner analogous to the action of dies in forging or extrusion. The effective plastic strain along the shear plane (deformation zone) in the chip can be systematically varied in the range of about 0.5 to about 10 by changing the tool rake angle, and to a lesser extent by changing the friction between tool and chip. The mean shear and normal stresses on the shear plane can be varied by changing the tool geometric parameters together with process parameters such as $V_c$ and $t_o$, while the values of these stresses can be obtained from measurement of the forces. Finally, the temperature in the deformation zone can be systematically varied by changing the cutting velocity. For example, by cutting at very low velocities (about 0.5 mm/s), the temperature can be kept marginally above the ambient temperature while achieving very large strain deformation. Alternatively, temperatures where phase transformations (e.g., martensitic, melting) may be expected to occur in the chip can be realized by increasing the cutting velocity to higher values, for example, about 1 to about 2 m/s. The ability to change the friction along the tool-chip interface by a factor of up to three has also been demonstrated using a combination of tool coatings, low-frequency modulation of the tool-chip interface and lubrication which assures that lubricant is always present at the interface between the tool and the chip. The extent to which friction (as well as the other parameters and conditions discussed above) can be controlled in a machining operation is not possible in other severe plastic deformation processes. In summary, the temperature, stress, strain, strain rate and velocity fields in the zone of deformation can be well estimated using available mechanics models or obtained by direct measurement. Thus, very large strain deformation conditions can be imposed and varied systematically over a wide range, a range over and beyond that currently obtainable in other severe plastic deformation processes.

In view of the above, U.S. Pat. No. 6,706,324 provides a basis for production of nanocrystalline structures in a wider group of materials and at lower costs compared to other processes. For example, chips machined from 6061-T6 aluminum stock with a +5 degree rake tool have been produced to have generally equi-axed grains with a typical grain size of about 75 nm. As a result of the grain refinement achieved during machining, the chips exhibited hardnesses of about 150 HV, which was up to 50% harder than the original bulk stock. Such nanocrystalline chips can be consolidated into components or structures through powder metallurgy (PM) processes or serve as important constituents in metal and polymer matrix composites. While U.S. Pat. No. 6,706,324 discloses that chips can be produced to have a desirable shape and size through secondary comminution (e.g., ball, attrition, jet milling, etc.), the modulation technique of this invention produces chips of desirable shapes and sizes directly through the machining process. More particularly, if appropriate conditions of modulation are applied in the tool feed direction during machining, then the uncut chip thickness equals zero during each cycle of modulation, effectively breaking the chip. These conditions occur when the peak-to-peak amplitude of modulation is greater than the tool feedrate and the frequency of modulation is properly controlled, namely, the modulation frequency and workpiece rotational frequency meet sufficient conditions. As such, by combining the production of nanocrystalline materials by machining and modulation machining techniques, nanocrystalline chips of specific sizes and shapes can be produced by modulation machining of the bulk parent material. While U.S. Pat. No. 6,706,324 discloses secondary comminution processes to convert nanocrystalline chips into smaller chip forms for use in PM processing and other consolidation processes, comminution processes offer only limited or no controllability of the final size and shape of the chips. Accordingly, the production of nanocrystalline chips via modulation-assisted machining in accordance with this invention offers notable advantages in production process control and capability.

Figure 2:
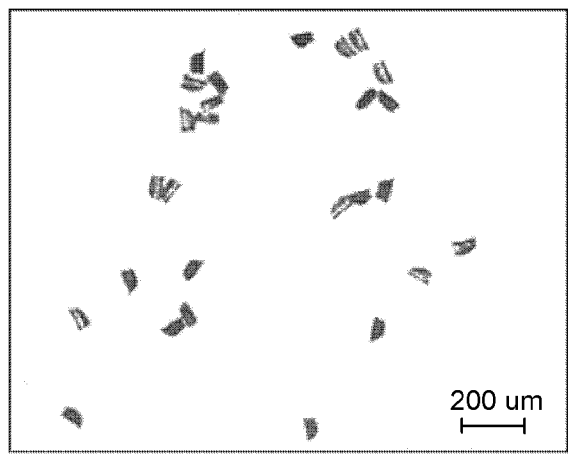
FIGS. 2 and 3 are scanned images of nanocrystalline chips produced by modulation-assisted machining techniques of this invention.
Figure 2:
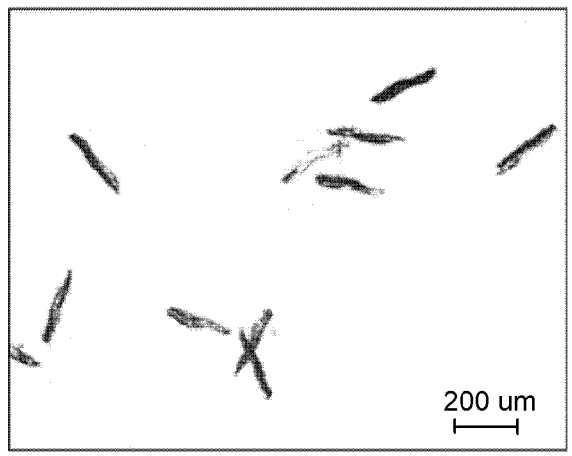
Figure 2:
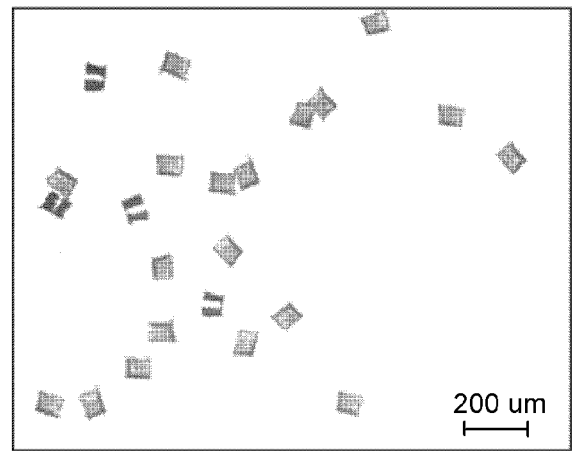
Figure 3:
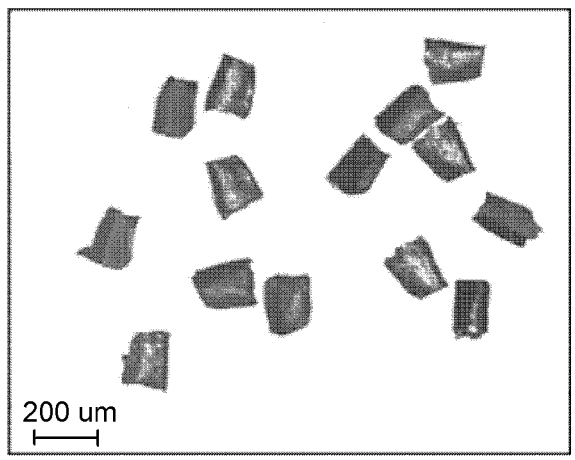
Figure 3:
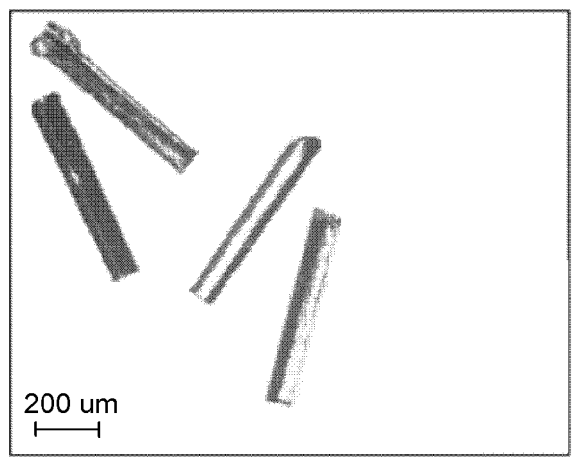
Figure 3:
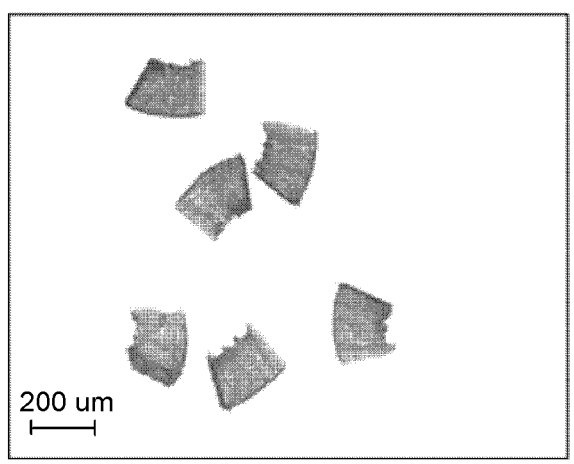

Modulation-assisted machining techniques of this invention are believed to be capable of inducing in bulk metals and metal alloys sufficiently high plastic strain deformation to produce nanocrystalline chips with sizes ranging few nanometers to several millimeters in length. As an example, FIGS. 2 and 3 are photomicrographs of 6061-T6 nanocrystalline aluminum chips produced with a 0 (zero) degree rake angle tool in an orthogonal modulation-assisted turning operation. The chips generally have equiaxed grains with a typical grain size of about 75 nm. The particulates in FIG. 2 are substantially identical in volume (about $6.25 \times 10^{-5}$ mm$^3$), though in different shapes, including equiaxed, needle, and platelet. The particulates in FIG. 3 are also identical volume particles (about $168.8 \times 10^{-5}$ mm$^3$), again in different shapes including equi-axed, needle, and platelet. These particles were produced using different size diameter bars in a cylindrical turning operation. The workpiece rotational speed, depth-of-cut, and modulation frequency and amplitude were varied based on the mathematical model for the modulation-assisted machining process. As a result of the grain refinement achieved during machining, the chips exhibited hardness of about 150 HV, which was up to 50% harder than the original bulk stock. Such nanocrystalline chips can be consolidated into components or structures through powder metallurgy (PM) processes or serve as important constituents in metal and polymer matrix composites.

Modulation-assisted machining of nanocrystalline chip can be scaled from low-volume experimental demands to high-volume industrial demands by the same fundamental approach. For example, in the production of chips in particulate form, increased production rates can be accomplished by increased material removal rates complemented by increased modulation frequency limited by dynamic response, and the use of multiple edge cutting tools designed to proportionally increase chip production rate.

The basis for the modulation-assisting machining process of this invention will now be described in greater detail in reference to a cylindrical orthogonal turning operation, in which the cutting tool travels parallel to the axis of the workpiece being machined (the workpiece axis coinciding with the axis of the turning spindle) to remove a layer of material from the circumference of the workpiece. In other words, cutting tool travel (and therefore feed velocity) is parallel to the workpiece axis and in the direction of the view represented in FIG. 1. Those skilled in the art will appreciate that the application of modulation in transverse facing and cut-off turning operations, as well as other machining processes (e.g., drilling, milling, grinding, etc.), would follow a similar approach.

In the present example, the cutting velocity, $v_c$, is defined by the workpiece diameter and rotational speed according to the following equation:

$$v_c = 2\pi r f_w$$

Tool position, $z_o$, of the cutting tool at a given time t in the steady state is $$z_o = v_f t$$

where $v_f$ is feed velocity without modulation (e.g., mm/sec), and t is time (in seconds). The axial feed velocity, $v_f$, of the tool during cylindrical turning is defined by the feedrate, a, according to the following equation:

$$v_f = a f_w$$

where $v_f$ is the feed velocity without modulation (e.g., mm/min), a is the axial feedrate per revolution (e.g., mm/rev), and $f_w$ is the workpiece rotation frequency (rotations/second). The uncut chip thickness, h, at any time, t, is a constant function of the feedrate and the number of cutting edges of the tool used. For a tool with "n" cutting edges, the expression is $h(t) = a/n = $ constant.

While modulation can be a general function of time, a forced harmonic modulation in the direction of feed velocity is considered for the approach of the present example, and $f_m$ is the frequency of the modulation in cycles/second (Hz). If a sinusoidal modulation $z(t)=A \sin(2\Pi f_m t)$ is applied to the tool in the direction of feed velocity, the tool position varies periodically with time and the uncut chip thickness is a function of time. Based on earlier reports, at any time, t, the tool position is the difference between the instantaneous position of the tool z(t) and the relative position of the tool in the previous cycle z(t-T) (where T is the period of one cycle defined by workpiece rotation). Then, the instantaneous uncut chip thickness, h, is defined as $$h(t)=z_o+z(t)-z(t-T)$$

For sinusoidal modulation, the general form of uncut chip thickness as a function of time and the number of tool cutting edges, n, is $$h(t)=z_o/n+z(t)-z(t-T/n)$$

$$h(t)=v_f T/n+2A\{\cos[\Pi f_m(2t-T/n)]\sin[\Pi(f_m/n)T]\}$$

$$h(t)=a/n+2A[\cos(2\Pi f_m t-\Pi(f_m/n)/f_w)][\sin(\Pi(f_m/n)/f_w)]$$

where $f_w$ is the workpiece rotational speed (rotations/sec), T is the period of one revolution of the workpiece $=2\Pi/\omega_w=1/f_w$, n is the number of cutting tool edges, $V_f$ is the feed velocity without modulation (mm/sec), $f_m$ is the frequency of the modulation in cycles/sec (Hz) (107 $_m=2\Pi f_m$ rad/sec), A is one-half of the peak-to-peak amplitude of modulation (mm), and t is time (sec).

The formation of individual particles occurs when the uncut chip thickness (h) reaches a value of h=0 during each cycle of modulation. The values of time for h=0 are solved numerically. From the functional relationship of uncut chip thickness, the ratio of the modulation frequency and number of cutting edges to the workpiece rotational frequency $(f_m/n)/f_w$, must not be zero or an even integer, as even integer multiples of n in the expression for h(t) yield a constant value of $h(t)=v_f T=v_f/f_w$ (these conditions would imply no effect of modulation on uncut chip thickness; the relative change in the tool position per cycle, and subsequent cuts at time t follow the same path as the cut in the previous cycle t−T). In the case of cylindrical orthogonal turning, the number of cutting edges (n) is one (single point turning), and a sufficient condition for zero chip thickness is that the amplitude of modulation 2A is greater than or equal to "a" which is greater than or equal to $v_f/f_w$ and the ratio $f_m/f_w$ must be an odd integer multiple of ½. While these conditions are a mathematically sufficient condition to cause separation between the tool-chip interface at the intimate region of contact, the physical effects of system compliance (e.g., tool stiffness, workpiece stiffness) will increase the actual magnitude of amplitude 2A required to achieve h=0 and effectively break the chip. Furthermore, it is important to note that ratios of $f_m/f_w$ in the set of real values can lead to the formation of individual chip particles, depending on the value of the amplitude 2A.

From the numerical solutions of time values for h=0, it is possible to determine the characteristics of the chip formation frequency and the absolute chip length. These time-based attributes of chip formation are related to the modulation amplitude, modulation frequency, and the workpiece rotational frequency, but a unique expression is not tractable. However, the time duration of cutting with modulation can be determined from the numerical solutions of sequential time values where h=0. Control of the chip by modulation-assisted machining can significantly influence material handling in machining chip management or play an important role in applications where the size and/or shape of the chip is relevant. In general, for a given set of cutting conditions, the chip formation frequency is proportional to the ratio of the modulation frequency to the workpiece rotational frequency. Then, the number of chips broken per cycle of workpiece revolution is given by $$f_{CB}=f_m/f_w$$

where $f_{CB}$ is the frequency of broken chips per workpiece revolution (breaks/rev). The chip length can be decreased by decreasing the workpiece rotational speed or increasing the modulation frequency. Since the total rate of volumetric material removal is unchanged by modulation, the volume removed per cycle of modulation can be used to evaluate the shape of the chip. An approximate length, L, of the chip can be estimated from the duration of time that cutting takes place in each cycle of modulation and the relative cutting velocity. The actual shape (and length) of the chip results from a complex relationship between the actual path distance of tool penetration during modulation and the effects of the strain due to cutting.

$$L\approx 2\Pi r f_w T_{CB}$$

where r is the radius of the workpiece (e.g., mm), $T_{CB}$ is the cutting duration for one cycle of modulation (numerical solution time values where h=0), L is the approximate chip length (mm), and $f_w$ is the workpiece rotational frequency (rotations/sec).

The following example demonstrates modulation-assisted machining conditions for the direct production of nanocrystalline chip. The workpiece radius (r) is about 6.35 mm and the cutting conditions are prescribed with a radial depth of cut of about 0.050 mm, a feedrate (a) of about 0.015 mm/rev, and rotational frequency of the workpiece ($f_w$) of about 40 rpm. The amplitude of modulation must satisfy the sufficient conditions 2A greater than or equal to "a" which is greater than or equal to $v_f/f_w$ for effective chip formation. In this case, an amplitude of 2A=0.045 mm was prescribed by the actuator (0.045 is greater than 0.015), where a slightly larger than necessary amplitude will compensate for system compliance. The frequency of modulation was chosen as an odd integer of 99 Hz so as to avoid the possibility of an even integer multiple of $f_m/f_w$ (note that any odd integer multiple of modulation to workpiece rotational frequency $f_m/f_w$ are acceptable and 99 Hz was selected for the example; furthermore, any real value of $f_m/f_w$ may lead to chip formation depending on the amplitude and numerical solution of h(t)).

The resulting chip (particulate) is a rectangular prismatic shape. The resulting dimensions of the chip are dependent on the strain due to cutting. In general, the prescribed depth of cut, the workpiece rotational speed, and the modulation conditions are the main factors that impact the chip shape. For a given workpiece radius, an estimate of chip length is a function of the workpiece rotational frequency, time, and the cutting conditions. In this example, the chip formation occurs in $T_{CB}$=0.0053 second and the estimated chip length (based on $L\approx 2\Pi r f_W T_{CB}=2\Pi(6.35)(40/60)(0.0053)=0.141$mm.

It is important to note that, in the mathematical model, the chip length can be controlled directly by modifying the modulation conditions, and that essentially any length of chip can be obtained within the limits of the workpiece geometry.

For the production of machining chip, such as the particulates in the above example, it is proposed that the modulation be applied locally to the cutting tool. Technologies are available to incorporate modulation capacity in the fundamental design of state-of-the-art machine tool systems. These include recent advances in linear drive technology or high speed machine tool slide elements. Currently, the application of linear drives in machine tools is a consequence of increasing demand for speed, precision, and repeatability. However, emphasis has not been placed on exploiting the related inherent modulation capacity. Etrema Products, Inc. (Ames, Ia. USA) currently markets Active Machining Systems (AMS) based on magnetostrictive actuator technology in lathe machining applications to create barrel shaping while turning. This system could potentially be modified for modulation-assisted machining. However, the size of the device limits the potential machine applications. Similarly, Polytec PI, Inc. (Physik Instrumente, Auburn, Mass. USA) designs and markets custom fast tool servo slides for lathe machining applications using piezoelectric translator technology for increased slide velocity or an alternative to servo-motor mechanisms. While both of the commercial tool slide systems mentioned could potentially be modified to apply modulation during the machining process, they are limited by higher cost and custom design requirements.

In view of the above, the direct production of nanocrystalline chip by modulated machining creates a processing route by which virtually any metal or metal alloy can be machined directly into nanocrystalline chips with desired size and shape. Benefits of producing nanocrystalline chips include producing materials with excellent mechanical and physical properties while avoiding expensive primary processing operations (e.g., solution treating, age hardening, annealing, heat treating) on metal or metal alloy bulk materials normally associated with end-use or machinability of the base material. With this invention, the size and shape of a chip can be controlled through various forms of applied modulation and cutting conditions. This capability is achieved without the limitations encountered if attempting to comminute nanocrystalline chips using conventional comminution processes such as ball milling, attrition milling, jet milling, etc. Such limitations include their inherent limitations with ductile materials, their inability to produce a specific size and/or shape of the chip, and their inherent lack of scalability due to limited capacity.

Furthermore, the modulation machining technique of this invention has advantages over conventional technologies for producing nanocrystalline particles such as gas-phase condensation and high energy ball-milling. For example, the modulation machining technique of this invention is capable of creating nanocrystalline chip in virtually any metal or metal alloy, whereas present condensations methods are limited especially in the production of metal alloys. The present modulation machining technique is particularly energy efficient when producing nanocrystalline chips from ductile materials as compared to gas-phase condensation or high energy ball-milling, which require significantly larger energy input for production of nanocrystalline chips.

In addition to the ability to eliminate secondary comminution processing of nanocrystalline chips (e.g., breaking of strands, shredding, or comminution by high energy ball milling or attrition milling), the present invention offers the capability of achieving improved chip size distributions. Other advantageous aspects include the ability to adapt the process to existing or new computer numerically controlled (CNC) machining capital, minimal floor space requirements for chip production, and a continuous process as opposed to batch processes of the prior art, thereby providing faster product changeover, greater flexibility, and faster response to changing market demands.

While the invention has been described in terms of particular embodiments, it is apparent that other forms could be adopted by one skilled in the art. Accordingly, the scope of the invention is to be limited only by the following claims.

The invention claimed is:

1. A method of machining a body to controllably produce chips with determinable shapes and sizes, the method comprising:
   selecting at least one desired shape and size for chips produced by machining the body; and
   imposing a superimposed sinusoidal modulation on a cutting tool so as to move the cutting tool relative to the body and cause instantaneous and periodic engagement and separation between the cutting tool and the body at an intimate region of contact between the cutting tool and the body, wherein each periodic engagement and separation between the cutting tool and the body yields a chip, shapes and sizes of the chips are intentionally controlled by the superimposed modulation, cutting velocity, feedrate, depth of cut, and frequency and amplitude of the superimposed modulation are intentionally selected and controlled to produce the desired shape and size of the chips, and the chips are chosen from the group consisting of platelets, needles, ribbons, filaments, fibers, wires, and equiaxed particles.

2. A method according to claim 1, wherein the chips comprise nanocrystalline microstructures.

3. A method according to claim 1, wherein the superimposed modulation is imposed to limit the size of the chips to less than one centimeter in length.

4. A method according to claim 1, wherein the superimposed modulation is imposed to limit the size of the chips to less than one millimeter in length.

5. A method according to claim 1, wherein the superimposed modulation is imposed to limit the size of the chips to less than 0.1 millimeter in length.

6. A method according to claim 1, wherein the superimposed modulation is imposed to limit the size of the chips to less than 0.01 millimeter in length.

7. A method according to claim 1, wherein the superimposed modulation is imposed to limit the size of the chips to less than 0.001 millimeter in length.

8. A method according to claim 1, wherein the body rotates about an axis thereof and the superimposed modulation comprises movement of the cutting tool parallel to the axis of the body.

9. A method according to claim 1, further comprising consolidating the chips to form a product.

10. A method according to claim 1, further comprising dispersing the chips in a matrix material to form a composite product.

11. A method according to claim 1, further comprising forming a monolithic article entirely from one of the chips by deforming the chip.

12. A method according to claim 1, further comprising forming a monolithic article entirely from one of the chips by removing material from the chip.

13. A method of machining a body to controllably produce chips with determinable lengths, shapes and sizes, the method comprising:
   selecting at least one desired shape and size for chips produced by machining the body,
   rotating at least one of a cutting tool and the body,
   machining the body at a cutting velocity and a depth of cut, and imposing a superimposed sinusoidal modulation having a frequency and amplitude that causes relative movement between the cutting tool and the body, causes the uncut chip thickness to vary with time, and causes instantaneous and periodic engagement and separation between the cutting tool and the body at an intimate region of contact between the cutting tool and the body, wherein each periodic engagement and separation between the cutting tool and the body yields a chip, shapes and sizes of the chips are intentionally controlled by the superimposed modulation, the cutting velocity, feedrate, the depth of cut, and the frequency and amplitude of the superimposed modulation are intentionally selected and controlled to produce the desired shape and size of the chips, and the chips are chosen from the group consisting of platelets, needles, ribbons, filaments, fibers, wires, and equiaxed particles.

14. A method according to claim 13, wherein the superimposed modulation is imposed to limit the size of the chips to less than one centimeter in length.

15. A method according to claim 13, wherein the superimposed modulation is imposed to limit the size of the chips to less than one millimeter in length.

16. A method according to claim 13, wherein the superimposed modulation is imposed to limit the size of the chips to less than 0.1 millimeter in length.

17. A method according to claim 13, wherein the superimposed modulation is imposed to limit the size of the chips to less than 0.01 millimeter in length.

18. A method according to claim 13, wherein the body rotates about an axis thereof and the superimposed modulation comprises movement of the cutting tool parallel to the axis of the body.

19. A method according to claim 13, wherein the superimposed modulation is imposed to limit the size of the chips to less than 0.001 millimeter in length.

20. A method according to claim 13, wherein the chips comprise nanocrystalline microstructures.

21. A method according to claim 13, further comprising consolidating the chips to form a product.

22. A method according to claim 13, further comprising dispersing the chips in a matrix material to form a composite product.

23. A method according to claim 13, further comprising forming a monolithic article entirely from one of the chips by deforming the chip.

24. A method according to claim 13, further comprising forming a monolithic article entirely from one of the chips by removing material from the chip.

* * * * *

UNITED STATES PATENT AND TRADEMARK OFFICE
CERTIFICATE OF CORRECTION

PATENT NO. : 7,628,099 B2
APPLICATION NO. : 11/381392
DATED : December 8, 2009
INVENTOR(S) : B. Mann et al.

It is certified that error appears in the above-identified patent and that said Letters Patent is hereby corrected as shown below:

Column 7, line 28, delete "107" and insert therefore -- ω --.

Signed and Sealed this

Sixteenth Day of February, 2010

David J. Kappos
*Director of the United States Patent and Trademark Office*